Figure 1:
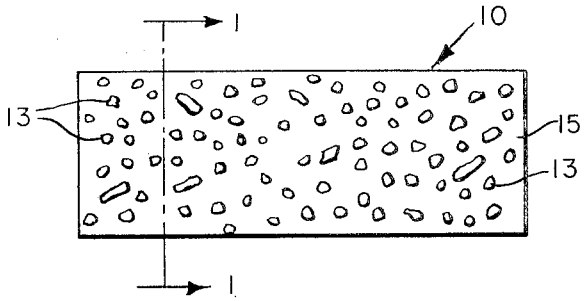
Figure 2:
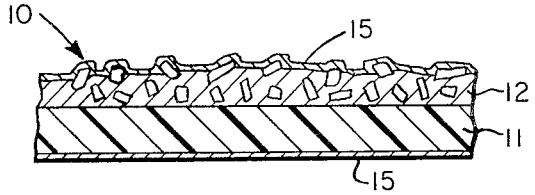
Figure 3:
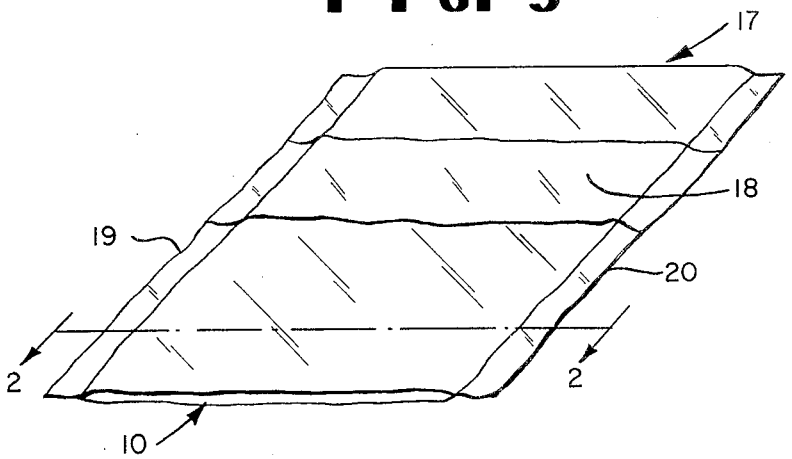
Figure 4:
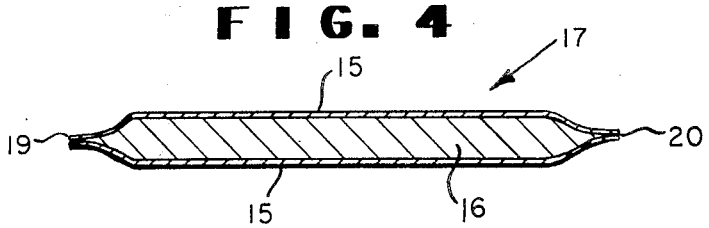

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 7

T950,009

CHEESE WRAPPING MATERIAL AND METHOD

Muhammad Saleh Sahli, Richmond, and Raymond Thomas Cole, Bon Air, Va., assignors to E. I. du Pont de Nemours & Company, Wilmington, Del.

Continuation of application Ser. No. 488,966, July 16, 1974. This application Jan. 16, 1976, Ser. No. 650,092

Int. Cl.[2] B65D *85/00*

U.S. Cl. 428—341

1 Sheet Drawing. 9 Pages Specification

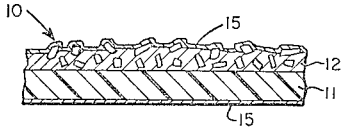

A heat-sealable wrapping material suitable for packaging single slice hot melt extruded process cheese in which a polyester film, having the surface thereof adapted to form the outside of a package, is coated with a copolymer barrier coating. The inner surface of the package and optionally the outer barrier coating surface is aftersized with an ester wax or a hydrocarbon wax having a melting point greater than the cheese extrusion temperature to improve not only cheese/film releasability in both the warm and cool state, but also surface slip properties essential to handling and manipulating the film and package in automatic packaging machines whereby smooth, uninterrupted operation against wet and dry surfaces at different temperatures is insured.

CHEESE WRAPPING MATERIAL AND METHOD

Original Filed Jan. 16, 1976